United States Patent
Agaram et al.

(10) Patent No.: US 7,516,276 B2
(45) Date of Patent: Apr. 7, 2009

(54) RUNTIME REGISTER ALLOCATOR

(75) Inventors: Kartik Agaram, Austin, TX (US); Marc A. Auslander, Millwood, NY (US); Kemal Ebcioglu, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/929,879

(22) Filed: Oct. 30, 2007

(65) Prior Publication Data
US 2008/0052470 A1    Feb. 28, 2008

Related U.S. Application Data

(63) Continuation of application No. 10/732,656, filed on Dec. 10, 2003, now Pat. No. 7,290,092.

(51) Int. Cl.
  *G06F 12/00* (2006.01)
(52) U.S. Cl. .................................. 711/128; 711/137
(58) Field of Classification Search ................ 711/128, 711/137
See application file for complete search history.

(56) References Cited

U.S. PATENT DOCUMENTS 5,918,245 A * 6/1999 Yung .......................... 711/122
6,438,673 B1 * 8/2002 Jourdan et al. .............. 711/213

* cited by examiner

*Primary Examiner*—Matt Kim
*Assistant Examiner*—Ryan Dare
(74) *Attorney, Agent, or Firm*—Ference & Associates LLC

(57) ABSTRACT

Methods and arrangements for accessing a storage structure. Included are an arrangement for providing a storage access instruction, an arrangement for inputting an address into a storage structure data cache responsive to a storage access instruction, an arrangement for extending a storage access instruction with a predicted register number field, the predicted register number field containing a predicted register number corresponding to a speculative location of a load/store operand associated with a storage access instruction, an arrangement for speculatively accessing a storage structure with a storage access instruction extended by the extending arrangement, and an arrangement for reverting to the arrangement for inputting an address if the load/store operand is not in the speculative location.

11 Claims, 4 Drawing Sheets

Figure 3

Address/size sent to an ordinary 8K, 8-way associative DL1, with 4 byte line size.

| Tag | Set Select | Offset | Size |
|---|---|---|---|
| A(0:21) [306] | A(22:29) [308] | A(30:31) [304] | SizeFromLdSt [302] |

Address/size sent to a modified 8K, 8-way associative DL1, with 4 byte line size, optimized for accessing part-word operands efficiently.

| Tag | Set Select | Offset | Size |
|---|---|---|---|
| SizeFromLdSt\|\|A(30:31)\|\|A(0:21) [302]\|\|[304]\|\|[306] | A(22:29) [308] | 0 | 4 |

Figure 4

Original contents of halfwords at::

0x00000200: 0xaabb *[402]*

0x00000202: 0xccdd *[404]*

Contents of modified DL1 set number 0b10000000, after executing:

Load halfword (2 bytes) from 0x200

Load halfword (2 bytes) from 0x202

| Tag | Data |
|---|---|
| Size=2,Offset=0,Upperbits=0 | 0x0000aabb *[406]* |
| Size=2,Offset=2,Upperbits=0 | 0x0000ccdd *[408]* |

Accessing the cache with "Load halfword rt=x200" once more, will not require alignment overhead. Register rt will be set to 0x0000aabb.

RUNTIME REGISTER ALLOCATOR

CROSS-REFERENCE TO RELATED APPLICATIONS

This application is a continuation application of U.S. patent application Ser. No. 10/732,656 filed on Dec. 10, 2003, now U.S. Pat. No. 7,290,092, the contents of which are hereby incorporated by reference in its entirety.

FIELD OF THE INVENTION

The present invention relates in general to memory access and increasing the efficiency thereof.

BACKGROUND OF THE INVENTION

In general, the number of clock cycles needed for accessing memory has been increasing. Solutions to this problem have indeed emerged over the years, but have not yet proven to be adequate. For instance, different caching techniques have been contemplated that store a subset of memory into smaller structures and use the data address to decide where a specific datum must be stored (see Smith, A. J., "Cache Memories", *Computing Surveys*, September 1982). However, it has also been noted that recent technological trends of increasing wire delays will lead to either increasing access times or decreasing capacities for caches (see Agarwal et al., "Clock Rate Versus IPC: The End of the Road for Conventional Microarchitectures", *Proceedings of the International Symposium on Computer Architecture [ISCA]*, 2000). Generally, the conventional technique of looking up caches by address will either cause conflict misses or require an associative search that can increase cache access time and consume excessive quantities of power. Register files tend not to present such problems.

Also, since the register number is a field which is part of the instruction, the desired register can often be accessed as soon as the instruction is fetched, leading to a short pipeline. This contrasts with caches in the context of current instruction sets, which require that an address first be read from a base or index register, then possibly be computed through an address addition, and then possibly be translated to a real address, before the cache access can start. Shorter pipelines can offer well-known advantages, such as lower branch penalties.

However, register use is usually scheduled by compilers, which tend to miss many opportunities for allocating memory locations into registers, because of the limitations of compile-time algorithms. For example, register allocation often requires that a compiler should prove that two pointers will never refer to the same memory location, which is hard to determine precisely at compile time.

Generally, a register file represents the first line of defense in avoiding accesses to main memory. By filtering accesses to the level-1 data cache (DL1), the register file reduces the number of accesses to the memory hierarchy. It thereby allows better utilization of the caches at all levels, thus conserving cache capacity and bandwidth for the instructions with poor temporal locality that actually need it. Modern algorithms for static register allocation succeed in servicing a large number of requests for data that would otherwise have to go to the memory hierarchy.

In spite of such sophisticated static algorithms, a large proportion of accesses to the DL1 exhibit temporal locality. While this is good for reducing the miss-rate of the DL1, it suggests that there is still additional room for filtering out accesses to the DL1.

In view of the foregoing, a need has been recognized in connection with improving upon the shortcomings and disadvantages of prior efforts.

SUMMARY OF THE INVENTION

In accordance with at least one presently preferred embodiment of the present invention, there is broadly contemplated herein the enhancement of existing store-by-address memory hierarchies in systems, with dynamic store-by-instruction techniques. In this latter approach, memory operands are accessed by short fields directly in the instruction, similar to register numbers. The proposed approach is dynamic, meaning that throughout the lifetime of the program, these register-number-like fields in a given instruction may be changed dynamically. In its end result, the proposed approach allows a higher level of associativity in caches, including fully-associative storage (i.e., whereby any datum can be stored in any location) without requiring the frequent use of expensive associative searches. As a result, larger and more highly associative storage structures will become feasible at "aggressive" clock rates.

Generally, an aim adopted herein is to avoid associative search while retaining the benefits of conventional cache line replacement policies. Towards this end, one may preferably perform location-prediction independently for each load and store instruction and store the location-prediction bits along with the instruction in the I-cache and the rest of the instruction memory hierarchy (In this context, the location of a load-store data operand in a set associative data cache may be defined as a sequence of bits indicating <associative set number, way number within set, offset with line>; i.e. the location contains sufficient information to access a load/store operand directly in a cache array, without performing any address computation, address translation or associative search).

Another aim adopted herein is to allow the data cache to be accessed as early in the pipeline as the register file, by way of the aforementioned location-prediction. In the case where location-prediction fails, one may preferably perform an associative search and access the cache in a conventional fashion. When location-prediction succeeds, however, then the process becomes quite similar to the way in which register files are typically accessed. Particularly, the location to access is preferably specified by bits in the instruction, and a simple and direct lookup is performed in the cache array, rather than associative search. Since the prediction is available immediately after instruction decode (and even immediately after instruction fetch, assuming the instruction encoding forces the critical location prediction bits to be always placed in the same bit positions within an instruction), one can now access the load and store operands earlier in the "pipeline", thus mimicking register-like access behavior.

In summary, one aspect of the present invention provides an apparatus for accessing a storage structure, the apparatus comprising: an arrangement for providing a storage access instruction; an arrangement for inputting an address into a storage structure data cache responsive to a storage access instruction; an arrangement for extending a storage access instruction with a predicted register number field, the predicted register number field containing a predicted register number corresponding to a speculative location of a load/store operand associated with a storage access instruction; an arrangement for speculatively accessing a storage structure with a storage access instruction extended by the extending arrangement; and an arrangement for reverting to the arrangement for inputting an address if the load/store operand is not in the speculative location.

Another aspect of the present invention provides a method of accessing a storage structure, the method comprising the steps of: providing a storage access instruction; providing an arrangement for inputting an address into a storage structure responsive to a storage access instruction; extending the storage access instruction with a predicted register number field, the predicted register number field containing a predicted register number corresponding to a speculative location of a load/store operand associated with a storage access instruction; speculatively accessing a storage structure with a storage access instruction extended via the extending step; and reverting to the arrangement for inputting an address if the load/store operand is not in the speculative location.

Furthermore, an additional aspect of the present invention provides a program storage device readable by machine, tangibly embodying a program of instructions executable by the machine to perform method steps for accessing a storage structure, the method comprising the steps of: providing a storage access instruction; providing an arrangement for inputting an address into a storage structure responsive to a storage access instruction; extending the storage access instruction with a predicted register number field, the predicted register number field containing a predicted register number corresponding to a speculative location of a load/store operand associated with a storage access instruction; speculatively accessing a storage structure with a storage access instruction extended via the extending step; and reverting to the arrangement for inputting an address if the load/store operand is not in the speculative location.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 3 schematically illustrates the way how a special DL1 optimized for avoiding the alignment overhead for part-word operands can be accessed.

FIG. 4 schematically illustrates how the part-word operands are stored in aligned form inside the special DL1 optimized for avoiding alignment overhead for part-word operands.

DESCRIPTION OF THE PREFERRED EMBODIMENTS

Figure 1:
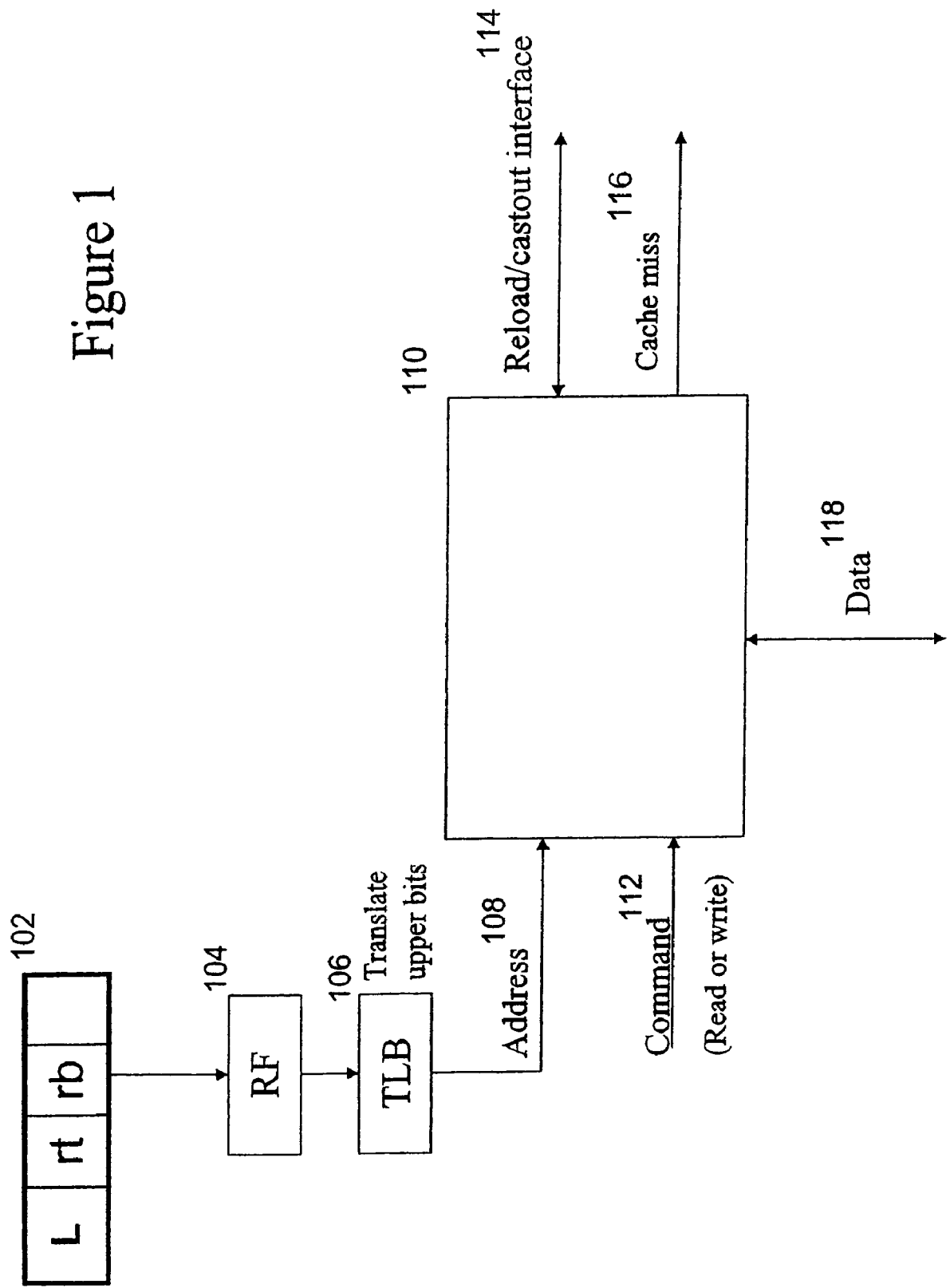
FIG. 1 schematically illustrates the execution of a load instruction in connection with a conventional set-associative data L1.

By way of general illustration, FIG. 1 shows a conventional set-associative data L1 cache, and how a simple load instruction uses it. The load instruction L rt=(rb) (102) will access the register file (RF) 104 with index "rb" to get the virtual address of the load operand. The upper bits of the virtual address are then translated to the corresponding real address 108 using a "translation lookaside buffer" 106. The set associative L1 data cache array 110 is accessed as usual, with the real address. Within a cache set, an associative tag-match comparison will be made against all entries in that set. If the desired cache line is not found in the L1 (or, as alternatively termed herein, DL1) cache, lower level caches will be searched, and the data will be brought into the L1 cache, evicting and possibly casting out an existing line in the L1 cache, according to the replacement policy. Other illustrated possible functions, as discussed heretofore, are: a read or write command (112), a reload/castout interface (114), a cache miss signal (116) and the importation/exportation of data (118).

Figure 2:
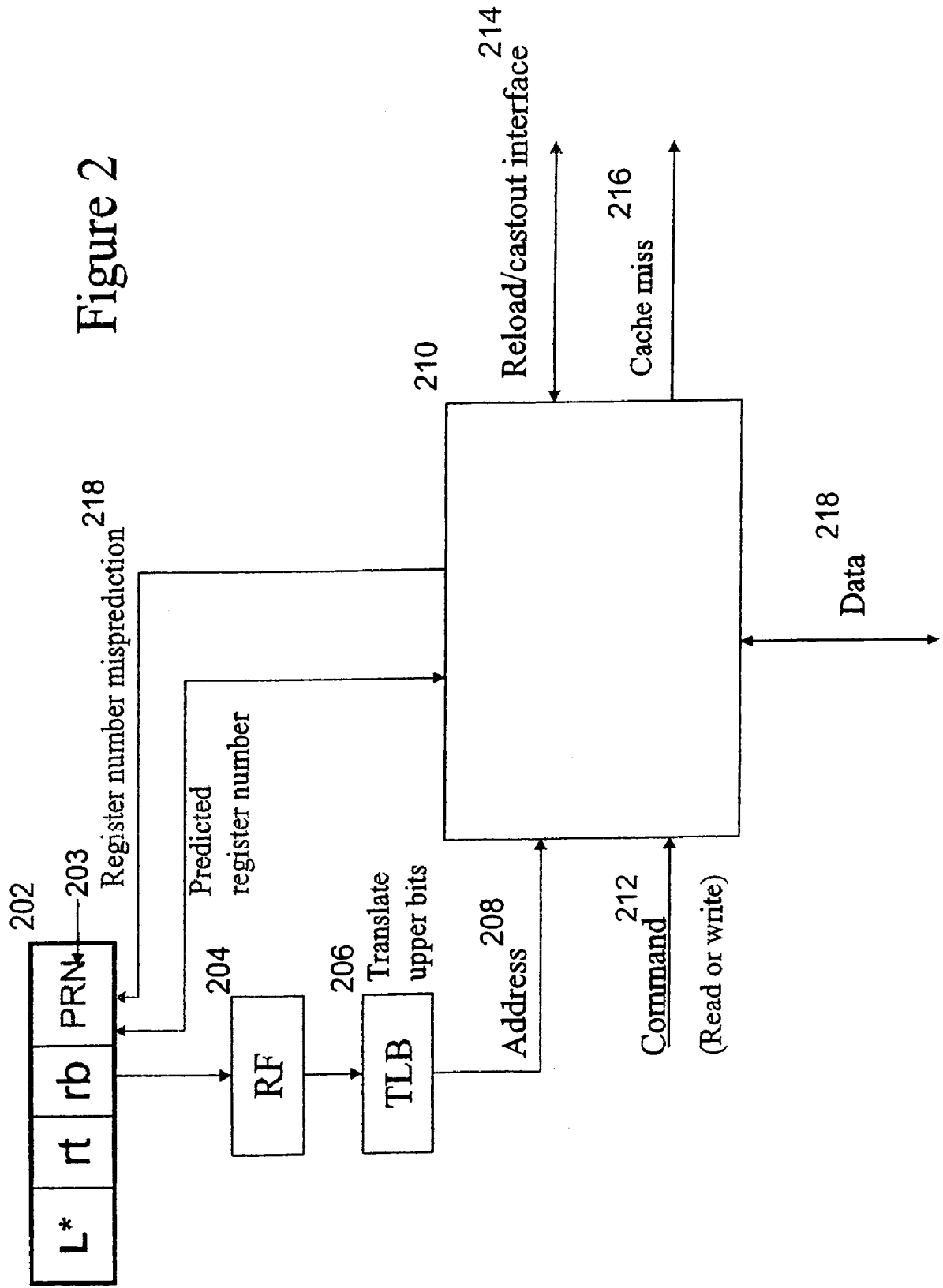
FIG. 2 schematically illustrates an analogous process as in FIG. 1, but in accordance with an embodiment of the present invention.

In contrast, in accordance with at least one presently preferred embodiment of the present invention (as shown in FIG. 2), all L/ST instructions (202) may preferably be extended with a Predicted Register Number (PRN) field 203. (Elements of FIG. 2 not mentioned here and otherwise analogous to those shown in FIG. 1 bear reference numerals advanced by 100.) The PRN comprises of the subfields <associative set index, way number within set, and offset within line>, and can be used to access the desired operand within the cache array directly, without performing any associative search and without having to perform any address computation or translation. First, the PRN is preferably sent to the L1 cache 210. The access is speculatively completed quickly, as if the L1 were a register file, and subsequent operations that may depend on the load data are also started speculatively, as soon as possible. If the L/ST operand is already in the cache array location denoted by PRN, then there is essentially nothing to be done; the access was correct. Otherwise, first, the speculatively started operations that may depend on the L/ST are "squashed" (canceled). The set-associative L1 cache 210 is accessed as usual, using the load/store real address (e.g., using, as discussed similarly with respect to FIG. 1, a register file (RF) 204 and "translation lookaside buffer" 206). If there is a cache miss (216), the lower level cache(s) are preferably accessed as usual, and an existing line in L1 210 is evicted for replacement (e.g., casting it out to level 2 [L2] if it was "dirty" or overwritten; the choice of line to be evicted can of course vary, according to the replacement policy in effect). The load/store instruction is then preferably completed with the correct operand in the L1 cache 210. Also, as indicated at 220, the correct current location of the load/store operand is preferably written into the PRN field 203 of load/store instruction 202 that caused the location misprediction.

By way of further elaboration, in accordance with an embodiment of the present invention, the size of load/store instructions is preferably increased via adding an extra field, "PRN" (predicted register number). This field denotes the predicted location of the memory load/store operand in the L1 data cache (DL1). The PRN field preferably includes subfields which indicate the precise location of a load/store operand within an n-way associative cache array directly, in the form: <associative set index, way number within set, offset within line>.

Preferably, when a load or store instruction executes, its PRN field will be provided to the data L1 (DL1) cache as a prediction about where the operand is expected to be in the DL1 cache. The memory address of the load/store operand is also preferably sent to the DL1 cache along with the size of the operand. If this is a store request, then the data to be stored is also preferably sent to the DL1 cache.

If the operand is indeed where the PRN field predicts (i.e., (1) the tag of the DL1 cache line designated by the "associative set index, way number within set" fields of the PRN is valid and actually contains the tag subfield of the load/store operand address, and (2) the associative set index subfield of the PRN matches the associative set index subfield of the load/store operand address, and (3) the "offset within line" subfield of the PRN field matches the "offset within line" subfield of the load/store operand address), the data is simply returned on a load request, or the operand in the DL1 cache is overwritten with the newly provided data on a store request.

If the operand is not where the PRN field predicts, the system will preferably perform a look-up of the memory hierarchy starting from the DL1 cache in a normal manner, with misses in the DL1 causing accesses to lower levels in the hierarchy and resulting in cache line replacements or cast outs according to the memory hierarchy policy in place. The new location of the operand (the <associative set index, way number, offset within line inside the DL1) will preferably be returned by the memory system, and the instruction's PRN field will be overwritten with this new operand location within the DL1 cache. If this is a load request, the data is also preferably returned with the new PRN value.

Since instructions have fields that can be written at runtime, the instruction L1 cache and instruction memory hierarchy will preferably permit write-back.

Preferably, there will be two special values of the PRN field, namely, the non-sticky invalid value and the sticky invalid value. The non-sticky invalid value in the PRN field forces a misprediction (i.e., does not match any cache line's tag) and thus results in a normal cache lookup, but the PRN field of a load/store instruction can be replaced by the correct value after its first execution. This sticky invalid value in the PRN field forces a misprediction and thus results in a normal cache access, but the PRN field cannot be replaced, so a load/store with a PRN field equal to the sticky invalid value always acts just like a normal load/store, without any operand location prediction.

When a program is first loaded in memory, the PRN fields of loads/stores are initialized to the non-sticky invalid value, so that during the first execution of a load/store a misprediction will occur and the PRN field will then be set to the location of the load/store operand in the DL1 cache. Various static compile-time or online run-time algorithms can be used to detect load/store instructions unsuitable for prediction (for example, when an instruction continually loads or stores new addresses), so that its PRN field can be set to the sticky invalid value, forcing the operation to behave like a normal load/store thenceforth, mispredicting on every execution. (See Calder et al., "A Comparative study of Load Speculation Architectures", *The Journal of Instruction Level Parallelism* 1, 2000, Section 3.2, for an online counter-based algorithm that can be used in this context. Similar compile-time techniques may be designed in accordance with Wang et al., "Guided Region Prefetching: A Cooperative Hardware/Software Approach", *Proceedings of the International Symposium on Computer Architecture*, June 2003, section 4.)

The PRN field is available as soon as the instruction is fetched, but the actual load/store address may be take multiple cycles to compute in a typical processor, involving reading a base and/or index register, possibly performing an address addition, and possibly performing a virtual to real translation on the upper bits of the address. In accordance with at least one embodiment of the present invention, a load instruction can execute immediately after the instruction is fetched, by accessing the location indicated in the PRN field, and then the operations dependent on the load can also be started speculatively. If a location misprediction is detected later, the operations dependent on the speculatively executed load that were already executed can be "squashed" (canceled), and re-executed with the correct data.

For the case where it is known that location mispredictions will occur frequently for a load (i.e., the PRN field is set to the sticky invalid value), loads can instead be optimized for the location misprediction case, by not performing the initial speculative access using the PRN, and scheduling independent operations while the longer latency load is taking place.

When predictions are correct, one can benefit from full associativity with register file-like access costs. Assuming that predictions will occur more frequently than mispredictions, a cache level where prediction is being used can be made fully associative, with only direct-mapped access costs when the prediction is correct. When a cache level is fully associative, there is only one set, thus the "set index" subfield in the corresponding PRN field can be omitted, thus making the PRN include only <way number, offset within line>.

In implementing the write-back to PRN fields, the writable store for updating the PRN field(s) of an instruction can be allocated inside the instruction cache (I-L1 and possibly I-L2) as in the foregoing description, or it can be implemented as a separate read/write array addressed by the program counter of a load/store instruction.

General registers and the data L1 cache can be unified. A PRN field has properties similar to a register index normally found in instructions; it allows register-sized fields in the DL1 cache to be read very early in a microprocessor pipeline, like general registers. The DL1 and the normal register file can in fact be merged in the same hardware array by using some special lines of the DL1 to store the ordinary general registers. This approach reduces load/store instructions where the predictions are correct, into register-to-register copy operations in the sense that the processing of these load/store instructions can begin as early in the "pipeline" as instructions involving only registers. The processor's general register operations (such as r1=r2+r3) can also be extended to operate not only on general registers but also on PRN fields, which refer directly to memory operands in the DL1 cache, as if they were general registers.

The following actions can be performed separately from, and concurrently with, the general register operations that efficiently perform arithmetic or logical operations on PRN fields:

(1) checking that the tag of the cache line given by a PRN field, as well as the set number and offset subfields of the PRN field, indeed match the load/store operand address;
(2) if there is a mismatch, looking up the operand at the given address in the memory hierarchy;
(3) accessing lower level caches such as L2, L2's of other processors, or the main memory and, if the operand is not found in the L1, choosing a line to evict in the L1, and casting it out if dirty (i.e., changed by a store);
(4) correcting the incorrect PRN fields in the instruction stream; and
(5) re-executing the operations that used the incorrect PRN fields and all of their already-executed dependent operations.

PRN field values can be reused to avoid rewriting instructions. When there is an advantage to avoid rewriting the PRN field of a load/store instruction, the memory hierarchy cache line eviction policy can be overridden to prefer using the same PRN field value for new addresses that a load/store refers to, where this is possible. If the PRN field remains the same even if the address has changed, this would avoid rewriting of the instruction. Not rewriting instructions could have benefits such as avoiding instruction cache port contention is some implementations.

The approaches broadly contemplated herein can be implemented by extending the Instruction Set Architecture (ISA) visible to the programmer (as above), or in a manner completely transparent to the programmer, inside the microarchitecture, or as part of a binary translation system. When the approach is being implemented transparently, the PRN fields of instructions will be created only in the instruction cache hierarchy (and initialized to the non-sticky invalid value) when the instructions are first read from memory, will be updated while they exist in the instruction cache hierarchy, and will be discarded when instruction cache lines are evicted from the instruction cache hierarchy.

An instruction may use more than one PRN field, and the datum can be accessed in multiple predicted locations given by the PRNs simultaneously, using multi-ported cache data arrays. If a location misprediction is detected later on any of the PRN fields, all operations that depended on the incorrect PRN and that were already executed, can be "squashed" (canceled). Execution can continue uninterrupted, if one of the PRN fields provided the correct location prediction. For the case where all of the PRN fields caused a misprediction, it suffices to write the correct location prediction in only one of the PRN fields of the instruction, and to re-execute the load or store and all the operations that depended on the load or store, that were already executed.

It is to be understood that although the present discussion has focused primarily on data cache access, the embodiments of the present invention contemplated herein can also be applicable in a wide range of general storage structures, such as instruction to caches, or unified caches, in addition to data caches. For example, an indirect branch instruction could include one or more PRN fields, for predicting the location of the branch target instruction in an associative instruction cache.

The embodiments of the present invention contemplated herein can also be applied to caches at lower levels, including L2 and L3 (here, L1 denotes the highest level in the cache hierarchy). Load/store operands that are not frequently accessed, can be kept at a lower level cache and never brought into the L1 or even L2, perhaps by specifying a "maximum cache level" as a new field in the load/store instruction, above which the datum accessed by the load/store should not be brought. Such operands can also be accessed faster by specifying a "Predicted Register Number" (PRN) field in the instruction, for accessing the speculative location of the operand in the L2 or L3 cache directly and more rapidly. In a multiprocessor environment where each processor has its own separate (perhaps L2) cache, to prevent unnecessary data exchange between the caches of different processors, the load/store operand can also be kept in another processor's cache, and the predicted location of a datum in the multiprocessor system can be expressed as a "Predicted Register Number" (PRN) field, comprising the <processor id, set number, way number within set, offset within line>. Using the predicted location of a datum in a multi-processor system can speed up inter-processor communication.

The approaches contemplated herein can also be applied to a special data cache, optimized for fast access to part-word load/store operands. Particularly, ordinary general registers have the advantage of being of fixed size (equal to the natural word size of the underlying machine, perhaps 4 or 8 bytes). The capability of using load/store operands that are smaller than the natural word size (part-word operands) will require an extra multiplexer delay (typically implemented as a byte rotation and masking operation) while accessing the data array, as compared to register file access. To circumvent this problem and to get closer to the access speeds of register files, a special set associative data L1 cache can be designed as follows:

The line size of the special DL1 will preferably be set to the natural word size of the underlying machine (4 bytes in the example in FIGS. 3 and 4).

FIG. 3 first illustrates how a load/store address is sent to the normal DL1 with 4 byte lines, and then to a special DL1 also with 4 byte lines, but optimized for accessing part-word operands efficiently. The examples here are for an 8K byte, 8 way associative data cache. High-endian addressing is used throughout FIGS. 3 and 4.

Given the original load or store address, the low order (least significant) 2 bits (304) will be removed from the end of the address and appended to the beginning of the address before sending it to the special DL1 cache. Also, the operand size (e.g., 1, 2 or 4 bytes) (302) will be appended to the beginning of the address being sent to the special DL1 cache. Thus the tag portion of the address will not only include the upper bits (306) of the original address, but also the operand size (302) and starting offset (304) within a word. The "set select" bits (308) can be taken from their usual place, just to the left of the low order 2 bits (304) of the original load/store address. When an operand of a given size is accessed from lower cache levels for the first time (using the normal load/store address) and brought into the special DL1 cache, it is right justified and zero-extended within the DL1 cache line (if smaller than 4 bytes). If there are other operands within the same set that overlap the present operand in any of their bytes, they will be evicted from this set and written to the lower level cache if they were "dirty" (overwritten). This ensures that only one instance of a given byte within a word will exist within the DL1, to prevent inconsistent states between multiple occurrences of the same byte in the cache.

FIG. 4 illustrates how two 2-byte halfwords in location 0x200 (402) and 0x202 (404) are brought into the special DL1, and right justified and zero extended (406 and 408). For example, once the halfword in location 0x200 (402) is placed in the special DL1 cache (408), no further alignment overhead is needed while accessing this halfword in the cache.

When an operand is accessed and found in the DL1 cache, (i.e. the operand size, and low order bits and the upper bits of the address are present within the tags of the set selected by the "set select" field of the address) the following happens: On a load hit, the operand is read from the cache without any further byte alignment. On store hit, the rightmost "operand size" bytes of the selected DL1 cache line is completely replaced by the rightmost "operand size" bytes of the new store datum.

When a line needs to be evicted and it was dirty (overwritten), it is written to the lower level cache using the original load/store operand address and size.

When the main idea of the present invention can be applied to such a special DL1 cache, then the PRN field in the Load/Store instruction comprises only of <Set number, way number within set>. The offset within line is always 0. Moreover, the speculative accesses become faster and more register-like, since there will be no byte rotation and masking (byte alignment) overhead to accommodate operands less than the natural word size, during the data access.

It is not difficult to optimize the same data cache to store sign extended operands as well, to avoid performing sign extension during loads that hit in the DL1 cache. For example, one could use a one-bit "sign extended" flag as an additional part of the cache tag.

It is to be understood that the present invention, in accordance with at least one presently preferred embodiment, includes an arrangement for providing a storage access instruction, an arrangement for inputting an address into a storage structure data cache responsive to a storage access instruction, an arrangement for extending a storage access instruction with a predicted register number field, an arrangement for speculatively accessing a storage structure with a storage access instruction extended by the extending arrangement, and an arrangement for reverting to the arrangement for inputting an address. Together, these may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for accessing a storage structure, said apparatus comprising:
   arrangement for providing a storage access instruction;
   an arrangement for inputting an address into a storage structure data cache responsive to a storage access instruction;
   an arrangement for extending a storage access instruction with a plurality of predicted register number fields, the predicted register number fields each containing a predicted register number corresponding to a speculative location of a load/store operand associated with a storage access instruction, wherein information contained in the plurality of predicted register number fields comprises:
   an associative set number;
   a way number within set; and
   an offset within line;
   an arrangement for speculatively accessing the multiple predicted locations simultaneously within a storage structure with a storage access instruction extended by said extending arrangement; and
   an arrangement for reverting to said arrangement for inputting an address if the load/store operand is found in none of the speculative locations;
   wherein the storage structure is a data cache,
   the speculative locations are speculative cache array locations, and
   the predicted register number fields contain information to start the speculative access as soon as the instruction is available, thereby precluding a need to compute and translate load/store addresses.

2. The apparatus according to claim 1, wherein the storage access instruction is a load/store instruction.

3. The apparatus according to claim 1, whereby the storage access is complete if the load/store operand is found in the speculative cache array location.

4. The apparatus according to claim 1, further comprising an arrangement for writing the correct location of the load/store operand into the plurality of predicted register number fields of the storage access instruction.

5. The apparatus according to claim 1, wherein said arrangement for inputting an address comprises of at least one of: a register file and a translation lookaside buffer.

6. A method of accessing a storage structure, said method comprising the steps of:
   providing a storage access instruction;
   inputting an address into a storage structure responsive to a storage access instruction;
   extending the storage access instruction with a plurality of predicted register number fields, the predicted register number fields each containing a predicted register number corresponding to a speculative location of a load/store operand associated with a storage access instruction, wherein information contained in the plurality of predicted register number fields comprises:
   an associative set number;
   a way number within set; and
   an offset within line;
   speculatively accessing the multiple predicted locations simultaneously within a storage structure with a storage access instruction extending via said extending step;
   reverting to said arrangement for inputting an address if the load/store operand is not in the speculative location;
   wherein the storage structure is a data cache,
   the speculative locations are speculative cache array locations, and
   the predicted register number fields contain information to start the speculative access as soon as the instruction is available, thereby precluding a need to compute and translate load/store addresses.

7. The method according to claim 6, wherein the storage access instruction is a load/store instruction.

8. The method according to claim 6, whereby the storage access is complete if the load/store operand is found in the speculative cache array location.

9. The method according to claim 6, further comprising an arrangement for writing the correct location of the load/store operand into the plurality of predicted register number fields of the storage access instruction.

10. The method according to claim 6, wherein said arrangement for inputting an address comprises of at least one of: a register file and a translation lookaside buffer.

11. A program storage device readable by machine, tangibly embodying a program of instructions executable by the machine to perform method steps for accessing a storage structure, said method comprising the steps of:
   providing a storage access instruction;
   inputting an address into a storage structure responsive to a storage access instruction;
   extending the storage access instruction with a plurality of predicted register number fields, the predicted register number fields each containing a predicted register number corresponding to a speculative location of a load/store operand associated with a storage access instruction, wherein information contained in the plurality of predicted register number fields comprises:
   an associative set number;
   a way number within set; and
   an offset within line;
   speculatively accessing the multiple predicted locations simultaneously within a storage structure with a storage access instruction extending via said extending step;
   reverting to said arrangement for inputting an address if the load/store operand is not in the speculative location;
   wherein the storage structure is a data cache,
   the speculative locations are speculative cache array locations, and
   the predicted register number fields contain information to start the speculative access as soon as the instruction is available, thereby precluding a need to compute and translate load/store addresses.

* * * * *